(12) United States Patent
Nanavati et al.

(10) Patent No.: US 10,666,750 B2
(45) Date of Patent: May 26, 2020

(54) ENHANCED PUSH MESSAGING (71) Applicant: Google LLC, Mountain View, CA (US)

(72) Inventors: Vibhor Nanavati, Santa Clara, CA (US); Anshul Kothari, Cupertino, CA (US); Amit Agarwal, Sunnyvale, CA (US); Gaurav Ravindra Bhaya, Sunnyvale, CA (US); Surojit Chatterjee, Los Altos, CA (US)

(73) Assignee: Google LLC, Mountain View, CA (US)

( * ) Notice: Subject to any disclaimer, the term of this patent is extended or adjusted under 35 U.S.C. 154(b) by 341 days.

(21) Appl. No.: 14/943,615

(22) Filed: Nov. 17, 2015

(65) Prior Publication Data

US 2017/0142214 A1    May 18, 2017

(51) Int. Cl.
*H04L 29/08* (2006.01)
*H04L 12/58* (2006.01)
*G06F 16/9535* (2019.01)
*G06F 16/9537* (2019.01)
*G06Q 30/02* (2012.01)
*G06F 15/16* (2006.01)

(52) U.S. Cl.
CPC .......... *H04L 67/26* (2013.01); *G06F 16/9535* (2019.01); *G06F 16/9537* (2019.01); *G06Q 30/0251* (2013.01); *H04L 51/04* (2013.01); *H04L 67/18* (2013.01); *H04L 67/20* (2013.01); *H04L 67/306* (2013.01); *G06F 15/16* (2013.01); *H04L 29/08* (2013.01)

(58) Field of Classification Search
USPC ....................................................... 709/206
See application file for complete search history.

(56) References Cited

U.S. PATENT DOCUMENTS

| 8,156,005 | B2 | 4/2012 | Vieri |
| 2008/0311934 | A1 | 12/2008 | Soderstrom |
| 2009/0011781 | A1 | 1/2009 | Merrill et al. |
| 2009/0125376 | A1 | 5/2009 | Sundaresan et al. |

(Continued)

OTHER PUBLICATIONS

International Search Report and Written Opinion in International Application No. PCT.US2016/056371, dated Dec. 14, 2016, 17 pages.

(Continued)

*Primary Examiner* — James A Edwards
(74) *Attorney, Agent, or Firm* — Fish & Richardson P.C.

(57) ABSTRACT

Methods, systems, and apparatus, including computer programs encoded on a computer storage medium, for facilitating and improving push messaging provided to users. In one aspect, a method includes receiving, from a user device, a request to subscribe to a push messaging service, selecting a given phone number that is uniquely associated with the user based on the received request, transmitting, to a user device, a first message that presents visual information at the user device and includes the given phone number, receiving, by the one or more servers, a second message addressed to the given phone number, selecting an additional message that presents additional visual information at the user device based, at least in part, on the message received from the user device and one or more of a geolocation of the mobile device or a time of day, and transmitting the additional message to the user device.

20 Claims, 5 Drawing Sheets

(56) References Cited

U.S. PATENT DOCUMENTS

| | | | |
|---|---|---|---|
| 2009/0181705 A1* | 7/2009 | Yin | H04L 51/066 455/466 |
| 2009/0299820 A1 | 12/2009 | Wang et al. | |
| 2010/0178904 A1* | 7/2010 | Low | G06Q 30/02 455/415 |
| 2010/0291907 A1* | 11/2010 | MacNaughtan | G06Q 30/0241 455/414.1 |
| 2012/0191790 A1* | 7/2012 | Abadir | H04L 51/14 709/206 |
| 2014/0079044 A1* | 3/2014 | Ding | H04W 84/12 370/338 |
| 2014/0247985 A1 | 9/2014 | Gibson et al. | |
| 2014/0365586 A1 | 12/2014 | Friborg, Jr. | |
| 2015/0024793 A1 | 1/2015 | Kaplinger et al. | |
| 2015/0163675 A1* | 6/2015 | Chang | H04W 12/08 455/411 |
| 2015/0341747 A1* | 11/2015 | Barrand | G06Q 30/0201 455/405 |

OTHER PUBLICATIONS

Andrews et al., "Mobile Ad Effectiveness: Hyper-Contextual Targeting with Crowdedness," Marketing Science, 2015, pp. 1-30.

Johnson, "How Does SMS Geofencing Work?" Tatango, Jul. 17, 2014 [retrieved on Nov. 16, 2015]. Retrieved from the Internet: URL<http://www.tatango.com/blog/how-does-sms-geofencing-work>, 9 pages.

Knox, "Mobile Contextual Advertising," Tilburg University, Master Thesis, Dec. 2008, 28 pages.

International Preliminary Report on Patentability issued in International Application No. PCT/US2016/056371, dated May 31, 2018, 14 pages.

EP Office Action issued in European Application No. 16788308.1, dated Jan. 3, 2019, 6 pages.

CN Office Action and Search Report in Chinese Application No. 201680004431, dated Oct. 9, 2019, 24 pages (with English translation).

* cited by examiner

| Advertiser Account | | | |
|---|---|---|---|
|  | Reached | Opened | Actions |
| Message 1 | 1000 | 800 | 100 |
| Message 2 | 850 | 300 | 65 |
| Message N | ... | ... | ... |

| Advertiser Account | | | |
|---|---|---|---|
|  | Reached | Opened | Actions |
| Campaign 1 | 1850 | 1100 | 165 |
| Campaign 2 | 2000 | 600 | 140 |
| Message N | ... | ... | ... |

| Advertiser Distribution Options | | | | |
|---|---|---|---|---|
|  | Geographic Area | Query | Time of Day | Location |
| Message 1 | Greater Boston | Televisions | 12-4 PM | Near Stores A, B |
| Message 2 | Western US | Televisions | 6-10PM | Near Store A |
| Message 3 | All other areas | Stereo | All times | Near Store B |
| Message N | ... | ... | ... | ... |

FIG. 3C

User Subscription Manager

MY Subscriptions

| | Current State | Frequency | Time of Day | Geo. Data | Location |
|---|---|---|---|---|---|
| List 1 | Enabled | 1/day | 12-10 PM | Enabled | Any |
| List 2 | Enabled | 5/day | 7-10AM, 5-10PM | Enabled | NOT Work |
| List 3 | Enabled | 3/week | Any | Disabled | ONLY Home |
| List N | ... | ... | ... | ... | ... |

[Advanced]

ENHANCED PUSH MESSAGING

BACKGROUND

This specification relates to data processing and push messaging content distribution.

The Internet and network capabilities facilitate the exchange of information and transactions between users across the globe. This exchange of information enables distribution of content to a variety of users. In some situations, information may be included in push messages that are provided to users that have subscribed to one or more subscription list of a subscription service.

SUMMARY

In general, one innovative aspect of the subject matter described in this specification can be embodied in methods that include the actions of receiving, from a user device, a request to subscribe to a push messaging service, and selecting, by one or more servers, a given phone number that is uniquely associated with the user based on the received request, wherein the given phone number differs from a phone number of the user. Additionally, the methods may include transmitting, to a user device and in response to receiving the request, a first message that presents visual information at the user device and includes the given phone number, and receiving, from the user device and by the one or more servers, a second message addressed to the given phone number. Further, the methods may include selecting, by the one or more servers, an additional message that presents additional visual information at the user device based, at least in part, on the message received from the user device and one or more of a geolocation of the mobile device or a time of day, and transmitting the additional message to the user device. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The subject matter discussed in this application enables push messages to be distributed based on contextual distribution information of the user associated with the user device for the content. For example, the subject matter of this application enables a push message to be provided to a user device when the user is in a most advantageous position to receive the third-party content of the push message positively and act on the content of the push message. Additionally, the subject matter of this application enables users to subscribe to push messaging services they are interested in and to receive the push messages directly on their user device when the contextual distribution information and user control information dictate the push message will be of the most use to the user.

The subject matter described in this document also reduces the amount of time required for a data processing apparatus to select and provide push messages that are provided to the user based on the push messaging system's interaction with a third-party content distribution system. This interaction results in less latency in selecting and timely providing the push message to the user.

The subject matter described in this document improves a push messaging system, for example, by enabling the push messaging system to collect data about a given user, and uniquely associate that collected data with the given user. For example, in some implementations, a unique push messaging phone number is automatically assigned to each user, and that unique push messaging phone number is associated with the data collected about that given user. When distribution criteria for a given push message are met by the data collected by the given user, the push messaging phone number associated with the given user is then used to deliver the push message to the given user (e.g., as a message delivered to the user's mobile phone). The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
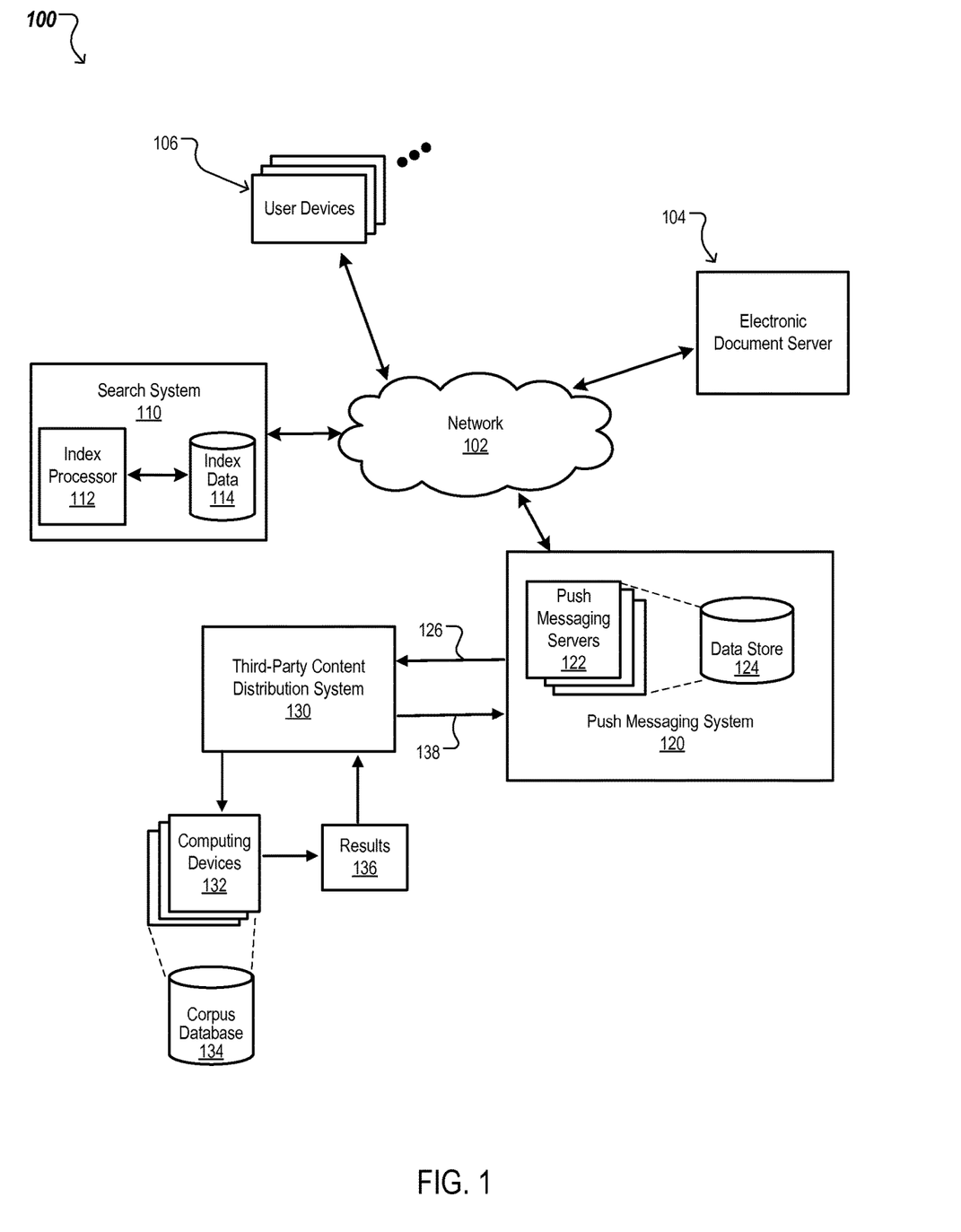
FIG. 1 is a block diagram of an example environment in which content is distributed.

This document discloses methods, systems, apparatus, and computer readable medium that facilitate and improve push messaging provided to users. FIG. 1 is a block diagram of an example environment 100 in which push messaging services are initiated and provided to users. The example environment 100 includes a network 102, such as a local area network (LAN), a wide area network (WAN), the Internet, or a combination thereof. The network 102 connects an electronic document server 104, user devices 106, a search system 108, and a push messaging system 120 that is in communication with a third-party content distribution system 130.

A user device 106 is an electronic device that is capable of requesting and receiving resources and content over the network 102. Example user devices 106 include personal computers, mobile communication devices, including cell phones and smartphones, and other devices that can send and receive data over the network 102. A user device 106 typically includes a user application, such as a web browser, to facilitate the sending and receiving of data over the network 102, but native applications executed by the user device 106 can also facilitate the sending and receiving of data over the network 102.

An electronic document is data that presents a set of content at a user device 106. Examples of electronic documents include webpages, word processing documents, portable document format (PDF) documents, images, videos, search results pages, and feed sources. Native applications (e.g., "apps"), such as applications installed on mobile, tablet, or desktop computing devices are also examples of electronic documents. Electronic documents can be provided to user devices 106 by electronic document servers 104. For example, the electronic document servers 104 can include servers that host publisher websites. In this example, the user device 106 can initiate a request for a given publisher webpage, and to the electronic server 104 that hosts the given publisher webpage can respond to the request by sending machine executable instructions that initiate presentation of the given webpage at the user device 106.

In another example, the electronic document servers 104 can include app servers from which user devices 106 can download apps. In this example, the user device 106 can download files required to install an app at the user device 106, and then execute the downloaded app locally.

Electronic documents can include a variety of content. For example, electronic document can include static content (e.g., text or other specified content) that is within the electronic document itself and/or does not change over time. Electronic documents can also include dynamic content that may change over time or on a per-request basis. For example, a publisher of a given electronic document can maintain a data source that is used to populate portions of the electronic document. In this example, the given electronic document can include a tag or script that causes the user device 106 to request content from the data source when the given electronic document is processed (e.g., rendered or executed) by a user device 106. The user device 106 integrates the content obtained from the data source into the given electronic document to create a composite electronic document including the content obtained from the data source.

To facilitate searching of these electronic documents, the search system 110 identifies the electronic documents by crawling the electronic document server 104 (e.g., by crawling a publisher websites and indexing the resources provided by the publisher websites). The electronic documents are indexed by the index processor 112 and the information is stored in index data 114. Although the index processor 112 and index data 114 is depicted as a single entity, it can include multiple parts and different indexes. The user devices 106 may submit search queries to the search system 110. The search queries are submitted in the form of a search request that includes the search request and, optionally, a unique identifier that identifies the user device 106 that submits the request. The unique identifier can be data from a cookie stored at the user device, or a user account identifier if the user maintains an account with the search system 110, or some other identifier that identifies the user device 106 or the user using the user device.

In response to the search request, the search system 110 uses the index processor 112 to identify electronic documents that are relevant to the queries. The search system 110 identifies the electronic documents in the form of search results, answers, knowledge cards, among others, and returns data describing the responsive information to the user devices 106 in a search results page that is graphically presented on a display of the user device.

A search result is data generated by the search system 110 that identifies one or more electronic document or provides information that satisfies a particular search query. A search query is a command input at the user device 106 for the search system 110. Other information, such as answers and knowledge cards, may include facts derived from the electronic documents, and optionally may also include links to the electronic documents from which the facts were derived. The search results may be ranked based on scores related to the resources identified by the search results. The user devices 106 receive the search results pages and render the search results page (e.g., execute machine readable instructions that define the search results page) for presentation to users according to the rank.

The queries submitted during the search sessions may be stored in index data 114. In particular, the index data 114 stores queries for search sessions by a set or subset of users. The index data 114 also includes data describing an input context for each query input. An input context of the query input is different from content described by the query input in that an input context describes the context surrounding the input of the query input. The context of each search query are independent of the actual content described by the query input. The context of a search query can include, for example, a time of day at which the search query was submitted, a browser and/or device being used to submit the search query, a geolocation of the user device from which the search query was submitted, and other contextual information (e.g., weather conditions at the geolocation of the user device, events occurring near the geolocation of the user device, and/or other contextual information).

The push messaging system 120 provides push messages to user devices 106 when users subscribe to receive push messaging related to particular topics, products, or services. The push messaging system 120 includes one or more push messaging servers 122 and data store 124. The push messaging servers 122 may interact with the electronic documents to include a subscribe user interface element (e.g., a button or other call to action) in the electronic document. For example, with an electronic document that includes a set of search results, a subscribe user interface element may be presented along with the search results in the form of a button, as further described in FIG. 2.

Upon a user selecting the subscribe user interface element that is presented in an electronic document, the push messaging servers 122 receive contextual data from the user, which may be transmitted from the user device 106 to the push messaging servers 122 in the form of a data packet. For example, the data packet can have a header (or another portion) specifying that the data packet destination is the push messaging servers, and can have a payload (or another portion) in which the contextual data is included.

The contextual data may include the search query that was used to generate the electronic document (e.g., search results page) prior to the user interaction with the subscribe user interface element, the geographic location of the user device 106 and a time of day when the search query was provided, one or more subscription list that is associated with search query, the particular electronic document, or location within the particular electronic document where the subscribe user interface element was selected.

The push messaging server 122 includes a listing of one or more phone numbers where each phone number may correspond to a user for a particular subscription list. A subscription list may correspond to particular topics, products, or services. For example, if the user selected the subscription user interface element presented on an electronic document related to televisions (e.g., a search result page for the query "televisions"), then a subscription list for home electronics may be identified. The push messaging server 122 may then use the data store 124 to select a phone number from the list of phone numbers to provide to the user in order to associate the user with that particular subscription list. This selected phone number is then associated with the contextual data that was obtained based on the user's interaction with the subscribe user interface element, and will serve as a unique identifier for the contextual data corresponding to the subscription request. Also, if the user is logged into a search service account, then additional contextual data may be obtained and associated with the unique selected user phone number, which will enable this additional contextual information to be accessed by the push messaging system 120 and initiate push messages using the additional contextual information.

The push messaging server 122 may provide, to the user device 106 that selected the subscription user interface element, a phone number in order to confirm the user's association with the user with a particular subscription list. A message with the particular phone number may be provided to the user device 106 in the same or a different electronic document in which the user selected the subscription user interface element or in an electronic message (e.g., Short Message Service (SMS) or Multimedia Message Service (MMS)). The push messaging server 122 may then receive notification that the user device 106 communicated a confirmation of the association of the user with the particular subscription list using the phone number provided to the user device 106. The communication from the user device 106 may be over the network, and may, for example, be in the form of a SMS or MMS, among others, and in some implementation, the message provided to the user device 106 may request that a particular term or string of characters be provided in the communication from the user device 106 to the provided phone number (e.g., requesting the term "JOIN" be provided in the message).

Once the push messaging server 122 receives the requested communication with the provided phone number from the user device 106, the push messaging server 122 may associate the user device 106 phone number with the unique phone number used to confirm the association of the user with particular subscription list. The association of the user device 106 phone number with the unique phone number used to confirm the association of the user with the particular subscription list results in an association between the user device 106 phone number and the contextual data corresponding to the initial subscription request.

The push messaging system 120 communicates with the third-party content distribution system 130 to identify particular push messages to provide to users in one or more subscription lists. However, although a particular user device 106 may be associated with a subscription list that a push message has been identified for, the push messaging system 120 additionally determines whether user control information (e.g., limiting a number of messages transmitted to the user device, times when the user allows or disallows messages, etc.) associated with the particular user device 106 enables presentation of the push message, as further described in FIG. 2. Further, the user may adjust or change the user control information.

In some implementations, the push messaging system 120 may monitor contextual data for each of the users of the user devices 106 associated with one or more subscription list to determine if and/or when the contextual data meets distribution criteria that must be met for a given portion of third-party content to be distributed to users. Contextual data for each user may be obtained by the push messaging system 120, continuously or periodically, or requested by the push messaging system 120, and may include data, such as, geolocation data of the user devices 106 of the users in a particular subscription list (e.g., within proximity of a store associated with a subscription list), user interaction with electronic documents (e.g., a user seeking electronic documents in a search result), and other data. An advertiser or other third-party that provides push messages distributed by the push messaging system 120 may provide distribution criteria where, upon the distribution criteria being met by particular contextual data of one or more users on a particular subscription list, the push messaging system 120 initiates distribution of a push message to these users having contextual data that meet the distribution criteria. Distribution criteria may include, for example, a geolocation of the user device (e.g., near a particular store), a time of day (which may also include a particular, or range of, hours, days, weeks, months, etc.), user interaction with electronic documents (e.g., a user entering a search query for electronic documents related to the query provided where the user selected the subscription user interface element).

For example a third-party can specify, as distribution criteria, one or more keywords that are used to condition delivery of a particular third-party push content to users that enter a given geo-fence. In this example, a user that physically enters the geo-fence with their mobile device and has contextual data specifying that the user previously submitted a search query that matches the one or more keywords, can be delivered a push message that are distributed using the matched keyword. Similarly, the third-party can associate different distribution criteria with different portions of push content so that various users having different contextual data will receive different portions of push content. This enables third parties the ability to control the distribution of push messages on a per-user basis within a given list, and using contextual data beyond geo-location and/or time.

In some implementations, the push messaging system 120 provides a request 126 to the third-party content distribution system 130 to identify and provide third-party content that will be presented as a push message at one or more of the user devices. In some implementations, the third-party content is selected in less than a second (or some other specified amount of time) to avoid errors that could be caused by delayed selection of the third-party content. In some implementations, the selection of the third-party content is performed within an amount of time that ensures that the third-party content is delivered within a window of time during which the third-party content is relevant to the user. For example, if the push messaging system 120 receives data indicating that the user is driving in the direction of a given restaurant (e.g., at a high rate of speed), a push message informing the user that the restaurant is nearby (or another message) should generally be delivered before the user passes the restaurant to prevent the user from having to turn around to reach the restaurant.

In some implementations, the third-party content distribution system 130 includes a set of multiple computing devices 132 that are used to identify and select third-party content. The set of multiple computing devices 132 operate together to identify a set of third-party content that are eligible to be presented as a push message or included in content of a push message from among a corpus of millions of available third-party content. The millions of available third-party content can be indexed, for example, in a third-party corpus database 134. Each third-party content index entry can reference the corresponding third-party content and/or include distribution parameters that condition the distribution of the corresponding third-party content. The third-party content distribution system 130 can also specify a bid and/or budget for selecting the particular third party content.

The identification of the eligible third party content can be segmented into multiple tasks that are then assigned among computing devices within the set of multiple computing devices 132. For example, different computing devices in the set 132 can each analyze a different portion of the third-party corpus database 134 to identify various third-party content having distribution parameters that match information included in or provided by the push messaging system 120. In some implementations, each given computing device in the set 132 can analyze a different data dimension (or set of dimensions) and pass results 136 of the analysis back to the third-party content distribution system 130. For example, the results 136 provided by each of the computing devices in the set may identify a subset of third party content that are eligible for distribution as a push message and/or a subset of the third-party content that have certain distribution parameters or attributes.

The third party content distribution system 130 aggregates the results 136 received from the set of multiple computing devices 132 and uses information associated with the aggregated results to select one or more third party contents that will be provided as a response 138 to the push messaging system 120. For example, the third party content distribution system 130 can select a set of winning third-party content based on the outcome of one or more content selection processes, as discussed in further detail below.

Figure 2:
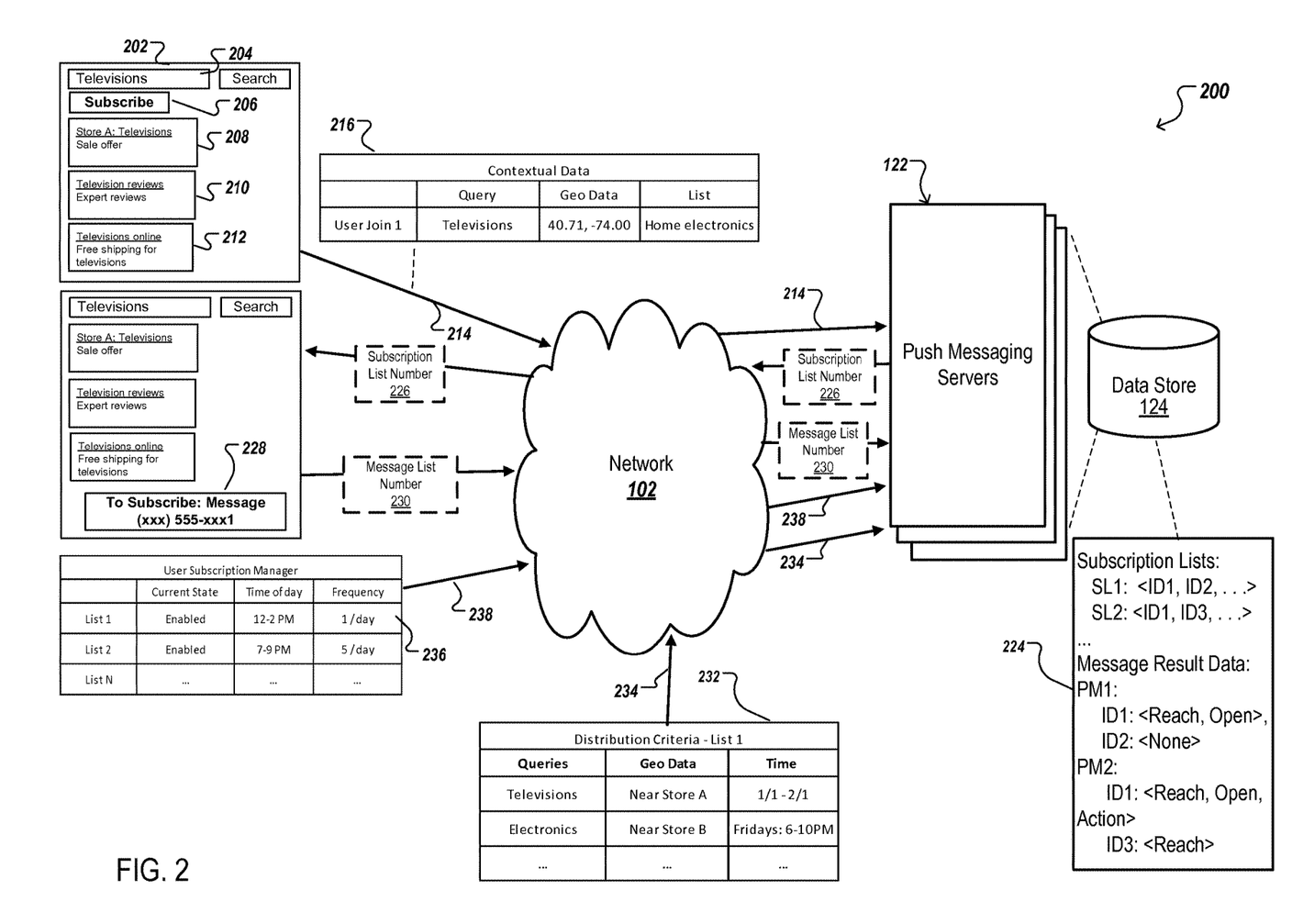
FIG. 2 is an example screen shot of a subscription process presented at a user device along with a system diagram of interaction between the user device and push messaging system.

FIG. 2 is an example screen shot of a subscription process presented at the user device along with a system diagram of interaction between a user device 106 and the push messaging system 120. A user device 106 may include a display area 202 where electronic documents and other content may be displayed to the user. As previously discussed, a search results page may be an electronic document that is provided to the user to facilitate searching of the electronic documents. For example, a user may provide the search query "Televisions" in query input 204, and search results 208, 210, and 212 may be provided, which may be electronic documents that are determined to be relevant to the search query, as previously described. In addition to the search results 208, 210, and 212, a subscribe user interface element 206 may be provided in the electronic document. However, as previously described, a subscribe user interface element 206 may be provided in other types of electronic documents as well (e.g., a home web page for a particular product). The push messaging system 120 may interact with the electronic documents to provide the subscribe user interface element 206, or the subscribe user interface element 206 can be embedded in the electronic document by a creator of the electronic document.

Upon a user selecting the subscribe user interface element 206, the user device may transmit 214 (e.g., send a data packet), through network 102, contextual data 216 to the push messaging servers 122. The contextual data 216 may include the search query that was used to generate the electronic document (e.g., search results page) prior to the user interaction with the subscribe user interface element, the geographic location of the user device 106 and a time of day when the search query was provided, and one or more subscription list that is associated with search query, the particular electronic document, or location within the particular electronic document where the subscribe user interface element was selected.

The push messaging server 122 includes a listing of one or more phone numbers where each phone number may correspond to a user for a particular subscription list. The subscription list may correspond to particular topics, products, or services. For example, if the user selected the subscription user interface element presented on an electronic document related to "televisions" (e.g., a search result page for the query "televisions"), then a subscription list for home electronics may be identified.

The push messaging servers 122 may then transmit 226 the phone number that correspond to the user for the particular subscription list to be presented in a subscription message 228 at the user device 106. In some implementations, the push messaging servers 122 may interact with the electronic document that is presented at the user device 106 to include the subscription message 228 in the electronic document. For example, in the display area 202, after the subscribe user interface element 206 was selected by the user, the subscription message 228 may be provided along with the same search results page. However, the subscription message 228 is not required to be shown at the same electronic document in which the subscribe user interface element 206 was presented and may be presented in other or different electronic documents.

The user of the user device 106 may then communicate a message 230 to the provided phone number to confirm the inclusion of the user on the particular subscription list to receive push messages. The communication from the user device 106 may be a message and may be over the network, and may, for example, be in the form of a Short Message Service (SMS) or Multimedia Message Service (MMS), among others, and in some implementation, the message provided to the user device 106 may request that a particular term or string of characters be provided in the communication from the user device 106 to the provided phone number. The push messaging server 122 may then receive the message 230 from the user device 106, and store the user's phone number, along with the user ID of the user (which may be the unique phone number provided to the user in the subscription message 228), and associate the user ID and phone number with the particular subscription list.

The push messaging system 120 may monitor changing contextual data for each of the users of the user devices 106 associated with one or more subscription list to determine if and/or when the contextual data meets distribution criteria. Example distribution criteria 232 is included in FIG. 2. The distribution criteria for initiating a push message for a subscription list may be based on one or more different distribution criteria. For example, the distribution criteria for initiating a push message to a user in the subscription list may require that the user selected the subscription user interface element from a search results page provided in response to a search query that matches a keyword in the distribution criteria. A different set of distribution criteria for initiating a push message to a user in the subscription list may be when the time is between 3-5 PM and the user is within a predefined area from a particular store (e.g., a store that sells home electronics if the subscription list is home electronics. A multitude of distribution criteria may be provided by the advertiser or other entity for each subscription list they are associated with. The distribution criteria 232 may be transmitted 234 to the push messaging system 120 and stored in data store 124.

As discussed above, the push messaging system 120 communicates with the third-party content distribution system 130 to identify and provide third-party content that will be presented as a push message. The push message is provided to phone numbers corresponding to the user devices 106 on the particular subscription list. The push messaging system 120 may provide particular user information to the third-party content distribution system 130 (e.g., in the request 126) that indicates the context data for each user in a subscription list. For example, if User A subscribed to the home electronics subscription list using a subscribe element provided when User A submitted a search query of "televisions," and User B subscribed to the home electronics subscription list using a subscribe element provided when User B submitted a search query of "stereos." This information may be provided to the third-party content distribution system 130 to select content for the push message that is relevant to the provided search query. This process may also be performed for a subset of users in the subscription list (e.g., a subset of users in the subscription list provided the search query "televisions" when they subscribed to the home electronics subscription list). Based on the previous example, the third-party content distribution system 130 may provide content related to "televisions" to be included in the push message for User A, and provide content related to "stereos" to be included in the push message for User B. More generally, any of the context data for each user in a subscription list may be provided to the third-party content distribution system 130 to select content for that user's push message. The use of the context data to create the push message enables the push messaging system 120 to selectively provide a user tailored push message to the users in the subscription list.

Additionally, a user subscription manager may be provided for the user to manage their subscriptions. For example, a user may select to enable or disable a particular subscription (e.g., indefinitely or for a period of time), set a maximum number of push messages received per time period per subscription (or a total number of push messages received per time period), set a time of day to receive push messages, select to enable or disable transmission of geographic information of the user device 106, and set location parameters for when to receive push messages. An example user subscription manager 236 is provided in FIG. 2, and includes different management options for each of List 1 and List 2 for the user. Upon the user of the user device 106 interacting with the user subscription manager, the user device 106 transmits 238 updated or modified information of the user subscription manager to the push messaging servers 122. When the push messaging servers 122 determines that the contextual distribution information is met, the push messaging servers 122 then determine if the user control information allows for distribution of the push message, and in some cases, the push message may be delayed or cancelled if the user control information does not allow the distribution.

For the push messages that are provided to the users, the push messaging servers 122 may collect push message result data for each push message or group of push messages and store the data in data store 124. The push message result data is indicated in the example data set 224. In some implementations, the push message servers 122 may determine if the push message reached the user device 106 (e.g., if the phone number associated with the user device 106 is accessible), if the push message was opened at the user device 106, and if action in response to the push message was taken. For example, a push message for the subscription list associated with the "skin care products" may provide for a discount for a particular type of soap. If the user of the user device 106 that receives the push message takes action by, for example, interacting with the push message to purchase the soap, the push message servers 122 would determine that action was taken for that particular push message.

Figure 3A:
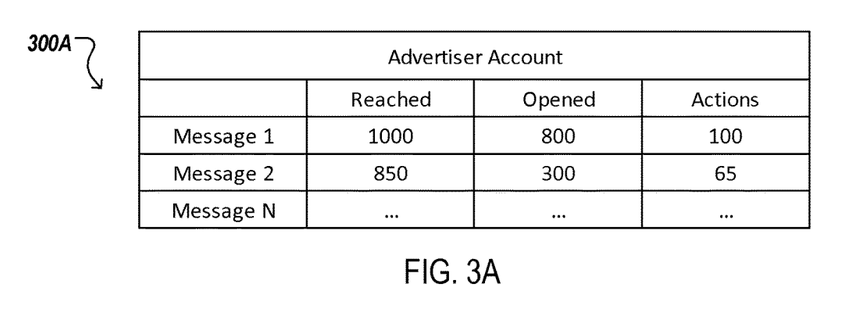
FIGS. 3A, 3B, and 3C are example advertiser account interfaces.
Figure 3B:
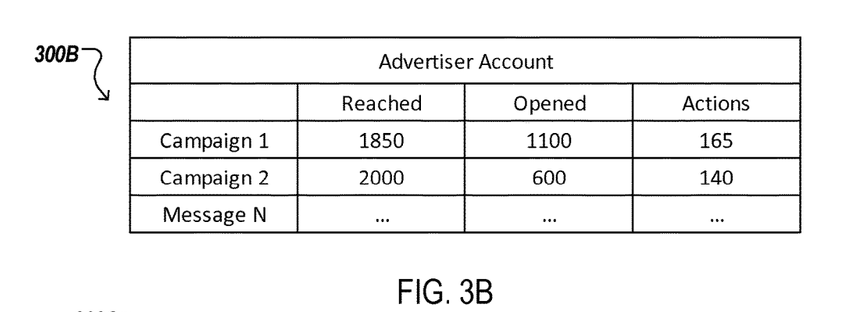
Figure 3C:
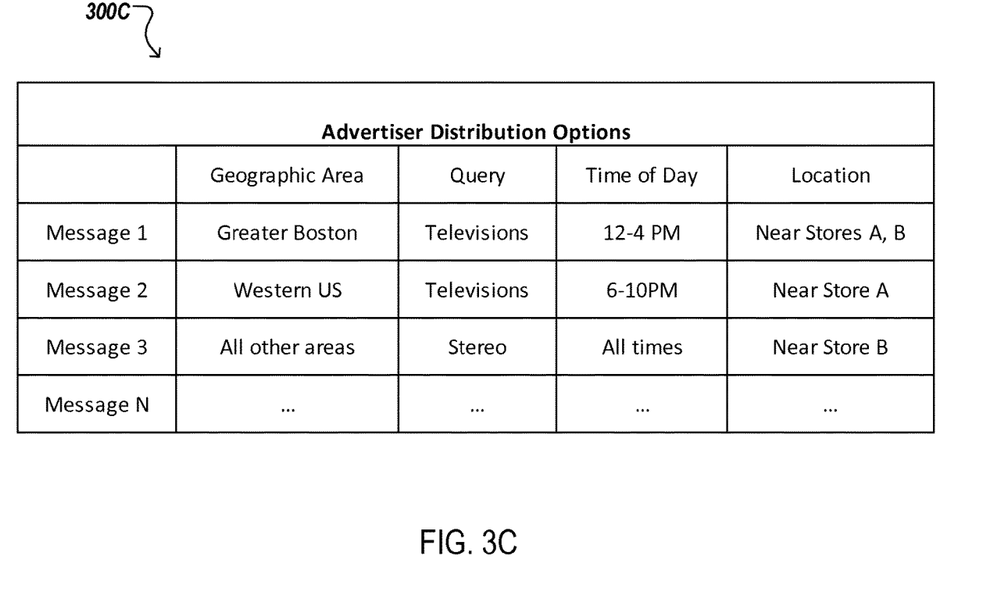

FIGS. 3A, 3B, and 3C provide example advertiser account interfaces. Different advertisers may interact with the push messaging system 120, and provide content to the third-party distribution system 130. The push messaging system 120 may provide information to advertisers related to the advertiser's account to indicate the performance of particular push messages and push message campaigns, as shown in FIGS. 3A and 3B. For example, in FIG. 3A interface 300A provides push message result data for different push messages, Message 1 and Message 2. As previously described, the push message result data may indicate if the push message reached the user device, if the push message was opened at the user device 106, and if action in response to the push message was taken. For example, to determine the push message reached the user device, a signal may be transmitted from the user device 106 back to the push messaging system 120 to indicate receipt. In some implementations, to determine that the push message was opened at the user device 106, a flag may be set when the push message is opened, and a signal may be provided from the user device 106 to the push messaging system 120 that includes the flag indicating the push message was opened. Additionally, the user device 106 may transmit a signal to the push messaging system 120 when an item or other content in the push message is selected at the user device 106 (e.g., the user selected a discount link provided in the push message). Also, FIG. 3B includes interface 300B that provides campaign push message result data where different push messages may be grouped into campaigns. For example, Campaign 1 may include both Message 1 and Message 2. Advertisers may use the advertiser account information to evaluate the performance of different push messages and campaigns.

Additionally, as provided in FIG. 3C at interface 300C, the advertisers may select different distribution options for each push message. The options selected by the advertiser may be communicated to the push messaging system 120 and third-party distribution system 130 to determine which push message to provide to various user devices 106 when the contextual distribution information is met. For example, as seen in interface 300C, distribution options may include geographic areas of user devices 106 (e.g., the area code associated with the user device 106 phone number), queries provided at the user devices 106, a time of day when the push message is to be delivered, and a locations of the user device 106. More or fewer distribution options may be included.

Figure 4:
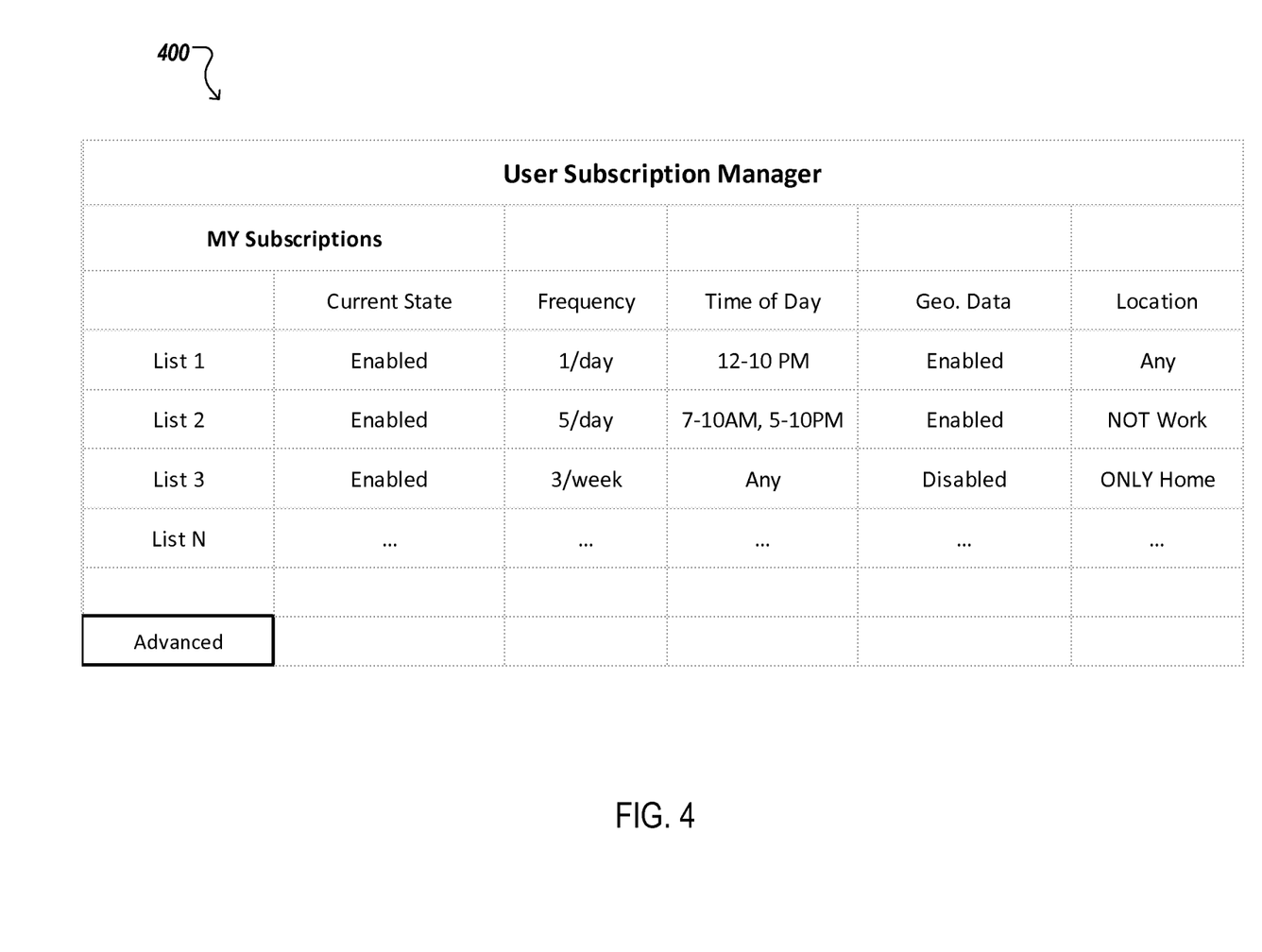
FIG. 4 is an example user subscription manager interface.

FIG. 4 provides an example user subscription manager interface. As previously described, a user subscription manager may be provided for the user to manage their subscriptions. An example user subscription manager interface 400 is provided in FIG. 4 where a user may provide user control information for List 1, List 2, and List 3 that include selecting to enable or disable a particular subscription (e.g., indefinitely or for a period of time), setting a maximum number of push messages received per time period per subscription, setting a time of day to receive push messages, selecting to enable or disable transmission of geographic information of the user device 106, and setting location parameters for when to receive push messages. More or fewer subscription management options for the user control information may be included. An "Advanced" option may also be provided where additional details may be provided for the user control information. When the push messaging servers 122 determines that the contextual distribution information is met, the push messaging servers 122 then determine if the user control information allows for distribution of the push message, and in some cases, the push message may be delayed or cancelled if the user control information does not allow the distribution. In some embodiments, the user control information may be applied before or after the selection of the particular push message from the third-party distribution system 130.

Figure 5:
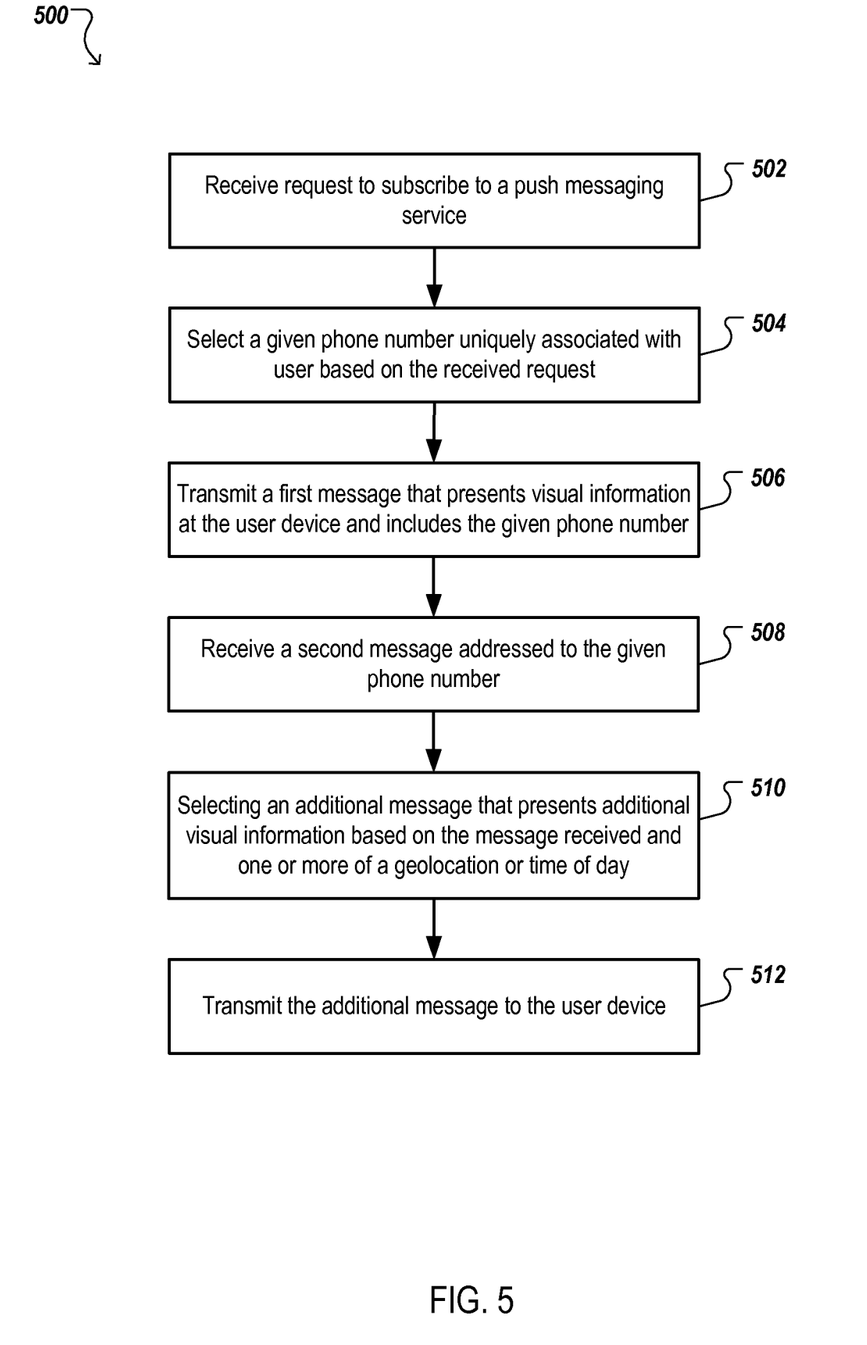
FIG. 5 is a flow chart of an example push messaging process.

FIG. 5 is a flow chart of an example push messaging process 500. The process 500 can, for example, be implemented by the push messaging system 120. In some implementations, the operations of the example process 500 can be implemented as instructions stored on a non-transitory computer readable medium, where the instructions cause a data processing apparatus to perform operations of the example process 300.

A request to subscribe to a push messaging service is received from a user of a user device 106 (502). As previously discussed, the user may provide this request by interacting with or selecting a subscribe user interface element presented in an electronic document. For example, the electronic document may be a search result page and along with the search results, a subscribe user interface element may be presented. For example, the request to subscribe may be presented in a data packet that includes data representing user interaction with the subscribe user interface element that is presented in an online search results page and including context data of the user device. The context data may be presented in a data packet specifying a search query that was used to generate the online search results page prior to the user interaction with the subscribe user interface element.

Upon a user selecting the subscribe user interface element, the user device may transmit (e.g., send a data packet), through network, contextual data to the push messaging servers 122. The contextual data may include the search query that was used to generate the electronic document (e.g., search results page) prior to the user interaction with the subscribe user interface element, the geographic location of the user device 106 and a time of day when the search query was provided, and one or more subscription list that is associated with search query, the particular electronic document, or location within the particular electronic document where the subscribe user interface element was selected.

The push messaging system 120 selects a given phone number that is uniquely associated with the user based on the received request (504). As previously described, the push messaging server 122 includes a listing of one or more phone numbers where each phone number may correspond to a user for a particular subscription list. A subscription list may correspond to particular topics, products, or services. For example, if the user selected the subscription user interface element presented on an electronic document related to "televisions" (e.g., a search result page for the query "televisions"), then a subscription list for home electronics may be identified. The push messaging server 122 may then use the data store 124 to select a phone number from the list of phone numbers to provide to the user in order to associate the user with that particular subscription list The push messaging system 120 transmits a first message that presents visual information at the user device 106 and includes the given phone number (506). The push messaging system may transmit to the user device 106 the phone number that correspond to the user for the particular subscription list to be presented in a subscription message (as seen as element 228 in FIG. 2). In some implementations, the push messaging servers 122 may interact with the electronic document that is presented at the user device 106 to include the subscription message in the electronic document. For example, as seen in FIG. 2, in the display area 202, after the subscribe user interface element 206 was selected by the user, the subscription message 228 may be provided along with the same search results page. However, the subscription message 228 is not required to be shown at the same electronic document in which the subscribe user interface element 206 was presented and may be presented in other or different electronic documents.

A message addressed to the given phone number is received (508). The user of the user device 106 may communicate the message to the provided phone number to confirm the request by the user to subscribe to the push messaging service and to finalize the inclusion of the user on that particular subscription list to receive push messages. The communication from the user device 106 may be a message and may be over the network, and may, for example, be in the form of a Short Message Service (SMS) or Multimedia Message Service (MMS), among others, and in some implementation, the message provided to the user device 106 may request that a particular term or string of characters be provided in the communication from the user device 106 to the provided phone number. The push messaging server 122 may then receive the message 230 from the user device 106, and store the user's phone number, along with the user ID of the user (which may be the unique phone number provided to the user in the subscription message 228), and associate the user ID and phone number with the particular subscription list.

An additional message that presents additional visual information may be selected based on the message received and one or more of a geolocation of the user device 106 or time of day (510). The push messaging system 120 may monitor context data for each of the users of the user devices 106 associated with one or more subscription list to determine if and/or when the context data meets the distribution criteria, as previously described. The context data of the user device 106 may include a geolocation of the user device 106 or time of day; however, other context data may be included. The context data may be indexed by the push messaging servers 122 and stored in the data store 124. Indexing the context data may include indexing at least one of a mobile phone number of the user device, a search query submitting by the user, a time of day at which the search query was submitted, or a geolocation of the mobile device according to the given phone number.

The additional message may be a push message that is initiated. Upon the push messaging system 120 determining to provide a push message to one or more user devices 106, the push messaging system 120 communicates with the third-party content distribution system 130 to identify and provide the third-party content that will be presented as the push message. The third-party content includes visual information as part of the push message. The push messaging system 120 may provide particular user information to the third-party content distribution system 130 (e.g., in the request 126) that indicates the context data for each user in a subscription list. More generally, any of the context data for each user in a subscription list may be provided to the third-party content distribution system 130 to select content for that user's push message. The use of the context data to create the push message enables the push messaging system 120 to selectively provide a user tailored push message to the users in the subscription list.

In some implementations, the push messaging system 120 may obtain the distribution criteria from the advertiser or other entity, the distribution criteria specifies conditions to be met in order for one or more push message to be distributed to the user device. The distribution criteria may include one or more of geolocation data of the user devices, a time of day, or user interaction with electronic documents associated with a subscription list. The push messaging system 120 may then determine that the distribution criteria are met based on the context data of the user device. After the determination, the push messaging system 120 may request third-party content from a third-party content distribution system to include in the additional message. Upon receiving the third-party content from the third-party content distribution system to include in the additional message, the push messaging system 120 may distribute the additional message using the phone number of the user device, the additional message to the user device based on the determination that the distribution criteria are met.

The additional message is transmitted to the user device (512). The push message may be provided to the phone numbers corresponding to the user devices 106 on the particular subscription list. In some implementations, a user may provide user control information to manage when they receive push messages. When the push messaging servers 122 determines that the distribution criteria is met based on the context data of the user device, the push messaging system 120 then determine if the user control information allows for distribution of the push message, and in some cases, the push message may be delayed or cancelled if the user control information does not allow the distribution. As previously described the user control information may include at least one of limiting a number of additional messages transmitted to the user device or times when the user device allows messages to be transmitted to the user device by the one or more push messaging servers.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

What is claimed is:

1. A method of push messaging comprising:
   receiving, by one or more servers and from a user device of a user, a request to subscribe to a push messaging service of a particular subscription list, with the one or more servers storing lists of phone numbers for respective subscription lists;
   selecting, by the one or more servers and in response to receiving the request, a given phone number from a list of phone numbers for the particular subscription list, wherein the given phone number differs from a phone number of the user device;
   transmitting, to the user device and in response to receiving the request, a first message that presents visual information at the user device and includes the given phone number used to confirm the request to subscribe to the push messaging service of the particular subscription list;
   receiving, by the one or more servers, a notification transmitted, by the user device, to the given phone number that is provided to the user device by the one or more servers and that differs from the phone number of the user device, with the notification specifying that the user device communicated a confirmation to receive messages from the particular subscription list;
   selecting, by the one or more servers, an additional message that presents additional visual information at the user device based, at least in part, on receipt of the notification transmitted to the given phone number by the user device; and
   transmitting the additional message to the user device.

2. The method of claim 1, wherein receiving a request to subscribe to a push messaging service comprises receiving a data packet including data representing user interaction with a subscribe user interface element that is presented in an online search results page and including context data of the user device.

3. The method of claim 2, wherein receiving a data packet including one or more context data includes receiving a data packet specifying a search query that was used to generate the online search results page prior to the user interaction with the subscribe user interface element.

4. The method of claim 1, wherein receiving the notification includes receiving a second message confirming the request to subscribe to the push messaging service, wherein the second message includes a mobile phone number of the user device.

5. The method of claim 1, further comprising:
obtaining distribution criteria specifying conditions to be met in order for one or more push messages to be distributed to user devices, wherein the distribution criteria includes one or more of geolocation data of the user devices, a time of day, or user interaction with electronic documents associated with a subscription list;
determining that the distribution criteria are met based on context data of the user device;
requesting third-party content from a third-party content distribution system to include in the additional message;
receiving the third-party content from the third-party content distribution system to include in the additional message; and
distributing, using the phone number of the user device, the additional message to the user device based on the determination that the distribution criteria are met.

6. The method of claim 5, further comprising:
determining that the user device will receive the additional message, the determination being made based on user control information including at least one of limiting a number of additional messages transmitted to the user device or times when the user device allows messages to be transmitted to the user device by the one or more servers.

7. The method of claim 1, further comprising indexing context data related to the user with the given phone number, including indexing at least one of a mobile phone number of the user device, a search query submitted by the user, a time of day at which the search query was submitted, or a geolocation of the user device according to the given phone number.

8. A computer storage medium encoded with a computer program, the program comprising instructions that when executed by a data processing apparatus cause the data processing apparatus to perform operations comprising:
receiving, from a user device of a user, a request to subscribe to a push messaging service of a particular subscription list, with the data processing apparatus storing lists of phone numbers for respective subscription lists;
selecting, in response to receiving the request, a given phone number from a list of phone numbers for the particular subscription list, wherein the given phone number differs from a phone number of the user device;
transmitting, to the user device and in response to receiving the request, a first message that presents visual information at the user device and includes the given phone number used to confirm the request to subscribe to the push messaging service of the particular subscription list;
receiving a notification transmitted, by the user device, to the given phone number that is provided to the user device by the data processing apparatus and that differs from the phone number of the user device, with the notification specifying that the user device communicated a confirmation to receive messages from the particular subscription list;
selecting an additional message that presents additional visual information at the user device based, at least in part, on receipt of the notification transmitted to the given phone number by the user device; and
transmitting the additional message to the user device.

9. The computer storage medium of claim 8, wherein receiving a request to subscribe to a push messaging service comprises receiving a data packet including data representing user interaction with a subscribe user interface element that is presented in an online search results page and including context data of the user device.

10. The computer storage medium of claim 9, wherein receiving a data packet including one or more context data includes receiving a data packet specifying a search query that was used to generate the online search results page prior to the user interaction with the subscribe user interface element.

11. The computer storage medium of claim 8, wherein receiving the notification includes receiving a second message confirming the request to subscribe to the push messaging service, wherein the second message includes a mobile phone number of the user device.

12. The computer storage medium of claim 8, further comprising:
obtaining distribution criteria specifying conditions to be met in order for one or more push messages to be distributed to user devices, wherein the distribution criteria includes one or more of geolocation data of the user devices, a time of day, or user interaction with electronic documents associated with a subscription list;
determining that the distribution criteria are met based on context data of the user device;
requesting third-party content from a third-party content distribution system to include in the additional message;
receiving the third-party content from the third-party content distribution system to include in the additional message; and
distributing, using the phone number of the user device, the additional message to the user device based on the determination that the distribution criteria are met.

13. The computer storage medium of claim 12, further comprising:
determining that the user device will receive the additional message, the determination being made based on user control information including at least one of limiting a number of additional messages transmitted to the user device or times when the user device allows messages to be transmitted to the user device by the data processing apparatus.

14. The computer storage medium of claim 8, further comprising indexing context data related to the user with the given phone number, including indexing at least one of a mobile phone number of the user device, a search query submitted by the user, a time of day at which the search query was submitted, or a geolocation of the user device according to the given phone number.

15. A system comprising:
a processor; and
a computer-readable medium coupled to the processor and having instructions stored thereon, which, when executed by the processor, cause the processor to perform operations comprising:
receiving, from a user device of a user, a request to subscribe to a push messaging service of a particular subscription list, with the system storing lists of phone numbers for respective subscription lists;

selecting, in response to receiving the request, a given phone number from a list of phone numbers for the particular subscription list, wherein the given phone number differs from a phone number of the user device;

transmitting, to the user device and in response to receiving the request, a first message that presents visual information at the user device and includes the given phone number used to confirm the request to subscribe to the push messaging service of the particular subscription list;

receiving, a notification transmitted to the given phone number that is provided to the user device by the system and that differs from the phone number of the user device, with the notification specifying that the user device communicated a confirmation to receive messages from the particular subscription list;

selecting an additional message that presents additional visual information at the user device based, at least in part, on receipt of the notification transmitted to the given phone number by the user device; and transmitting the additional message to the user device.

16. The system of claim 15, wherein receiving a request to subscribe to a push messaging service comprises receiving a data packet including data representing user interaction with a subscribe user interface element that is presented in an online search results page and including context data of the user device.

17. The system of claim 16, wherein receiving a data packet including one or more context data includes receiving a data packet specifying a search query that was used to generate the online search results page prior to the user interaction with the subscribe user interface element.

18. The system of claim 15, wherein receiving the notification includes receiving a second message confirming the request to subscribe to the push messaging service, wherein the second message includes a mobile phone number of the user device.

19. The system of claim 15, comprising:

obtaining distribution criteria specifying conditions to be met in order for one or more push messages to be distributed to user devices, wherein the distribution criteria includes one or more of geolocation data of the user devices, a time of day, or user interaction with electronic documents associated with a subscription list;

determining that the distribution criteria are met based on context data of the user device;

requesting third-party content from a third-party content distribution system to include in the additional message;

receiving the third-party content from the third-party content distribution system to include in the additional message; and distributing, using the phone number of the user device, the additional message to the user device based on the determination that the distribution criteria are met.

20. The system of claim 19, further comprising:

determining that the user device will receive the additional message, the determination being made based on user control information including at least one of limiting a number of additional messages transmitted to the user device or times when the user device allows messages to be transmitted to the user device by the system.

\* \* \* \* \*